(12) United States Patent
Besier

(10) Patent No.: US 6,472,622 B1
(45) Date of Patent: Oct. 29, 2002

(54) STEERING COLUMN SWITCH

(75) Inventor: Holger Besier, Oestrich-Winkel (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/610,139

(22) Filed: Jul. 5, 2000

(30) Foreign Application Priority Data

Jul. 9, 1999 (DE) .......................................... 199 31 994

(51) Int. Cl.$^7$ ................................................ H01H 3/16
(52) U.S. Cl. .................................. 200/61.27; 200/51.28
(58) Field of Search .......................... 200/61.27, 51.54, 200/51.28, 51.39

(56) References Cited

U.S. PATENT DOCUMENTS 6,008,457 A * 12/1999 Klein et al. .............. 200/61.54

* cited by examiner

Primary Examiner—Michael Friedhofer
Assistant Examiner—Lisa N K
(74) Attorney, Agent, or Firm—Thomas N. Twomey

(57) ABSTRACT

A steering column switch comprises, located on a steering column jacket tube of a motor vehicle, a support (2) for individual switches and comprises a housing (3). At least the visible wall sections (19) of the housing (3) and at least the visible wall sections (16) of the support (2) consist of a core (17, 21) and a sleeve (18, 22) each, whereby the core and the sleeve are connected with each other in one piece. This results in the optimal utilization of space, as well as in a pleasant exterior appearance of the steering column switch.

7 Claims, 3 Drawing Sheets

STEERING COLUMN SWITCH

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The invention herein relates to a steering column switch comprising a support for individual switches, which are mounted to a jacket tube of a steering column of a motor vehicle, and a housing.

Usually, steering column switches are arranged radially with respect to the steering column on said steering column's jacket tube, whereby the actuation of the steering wheel and hence the steering column in the jacket tube do not result in a movement of the steering column switch relative to the steering wheel. As a rule, steering column switches comprise a blinker switch, a driving-lights switch that is integrated in the switch lever of the blinker switch, and a wiper switch for the incremental actuation of the windshield wipers and for the switching functions of the windshield washer system. Such steering column switches have been known, for example, from (German) documents DE-AS 28 10 790 and DE 35 32 532 C2. Each steering column switch comprises a plurality of actively interacting components, thereby realizing a large number of switching functions. Depending on the type of vehicle, individual components are pre-assembled and then mounted to a support on the steering wheel jacket tube.

In a typical application the support acts as support for many different individual switches of the steering column switch and, consequently, must exhibit relatively high rigidity. Therefore, this support is made of plastic materials which have been reinforced with glass fibers or similar materials. As a result of aligning the glass fibers in the hardened plastic melt, these fibers are visible on the surface of the support, which, for design reasons, is considered undesirable. In order to protect the individual switches mounted to the support against environmental effects and hence against damage, the support is associated with a housing, which, in order to make it sturdy, is fabricated of a reinforced plastic material. In order to adapt the steering column switch to the vehicle interior or to achieve a pleasant appearance, an exterior housing—a so-called design sleeve—is mounted to the support and the housing. For assembly and manufacturing reasons the exterior housing is at a distance from the support and the housing, which is why the steering column switch requires correspondingly more space.

The problem to be solved by the invention herein is to provide a steering column switch of the above-described type, which accommodates individual switches while making maximum use of space, is inexpensive to manufacture and designed in a visually pleasing manner.

BRIEF SUMMARY OF THE INVENTION

In accordance with the invention herein this problem has been solved in that at least the visible wall portions of the housing and at least the visible wall portions of the support each consist of a core and a sleeve that are connected with each other in one piece.

The assembly of the present invention thus eliminates the need for an additional design sleeve or an additional exterior housing for the support and for the housing. Considering a given availability of space for the steering column switch, said switch has a relatively large interior space for the accommodation of associate switches because the one-piece connection of the respective cores and sleeves of the visible wall portions of the housing and the support eliminates any empty space between them.

The core must be considerably more sturdy than the sleeve. Therefore, the core preferably consists of a plastic material exhibiting relatively high rigidity and the sleeve of a plastic material exhibiting relatively low rigidity. Consequently, the core, for example, is manufactured of a plastic material which has been reinforced with glass fibers, has a relatively rough surface and is of lesser quality, whereas the sleeve consists of an unfilled plastic material with a surface quality that is higher than that of the core. Plastic materials which are used for manufacturing decorative visible surfaces usually exhibit relatively low rigidity. Furthermore, additional known fillers may be admixed to the work material for the core, if desired, for altering the electrical properties of the work material. In order to adapt the appearance of the sleeve to the surface properties of adjacent components of the steering column switch or to mount adjacent components to the sleeve, this sleeve preferably consists of a plastic material exhibiting properties which satisfy given requirements.

It is useful if the core and sleeve are produced by means of a two-component injection molding process. In this manner, the different materials can be processed to produce one inexpensive high-quality component by means of one manufacturing process.

Inasmuch as the sleeve must satisfy primary design requirements relating to the column and secondary requirements relating to mechanical and/or electrical properties, one development of the invention herein relates to a sleeve that has a lower wall thickness than the core. Therefore, to meet these requirements, the sleeve can be manufactured during a relatively short injection cycle and with a relatively low use of material.

In order to adapt the appearance of the steering column switch to other components installed in the motor vehicle's interior, the sleeve is preferably provided with a structured surface.

In accordance with an advantageous embodiment of the inventive idea the sleeve and the core of the respective wall portions of the housing are provided with cutouts for the actuation elements of the individual switches. For this purpose the sleeve encloses at least part of the wall of the core cutout. As an alternative, the sleeve projects slightly beyond the wall of the core cutout. Such an arrangement provides assembly openings for the actuation elements, whereby the core is covered at the abutting edges of the latter. This ensures a uniform appearance of the steering column switch.

DETAILED DESCRIPTION OF THE INVENTION

Figure 1:
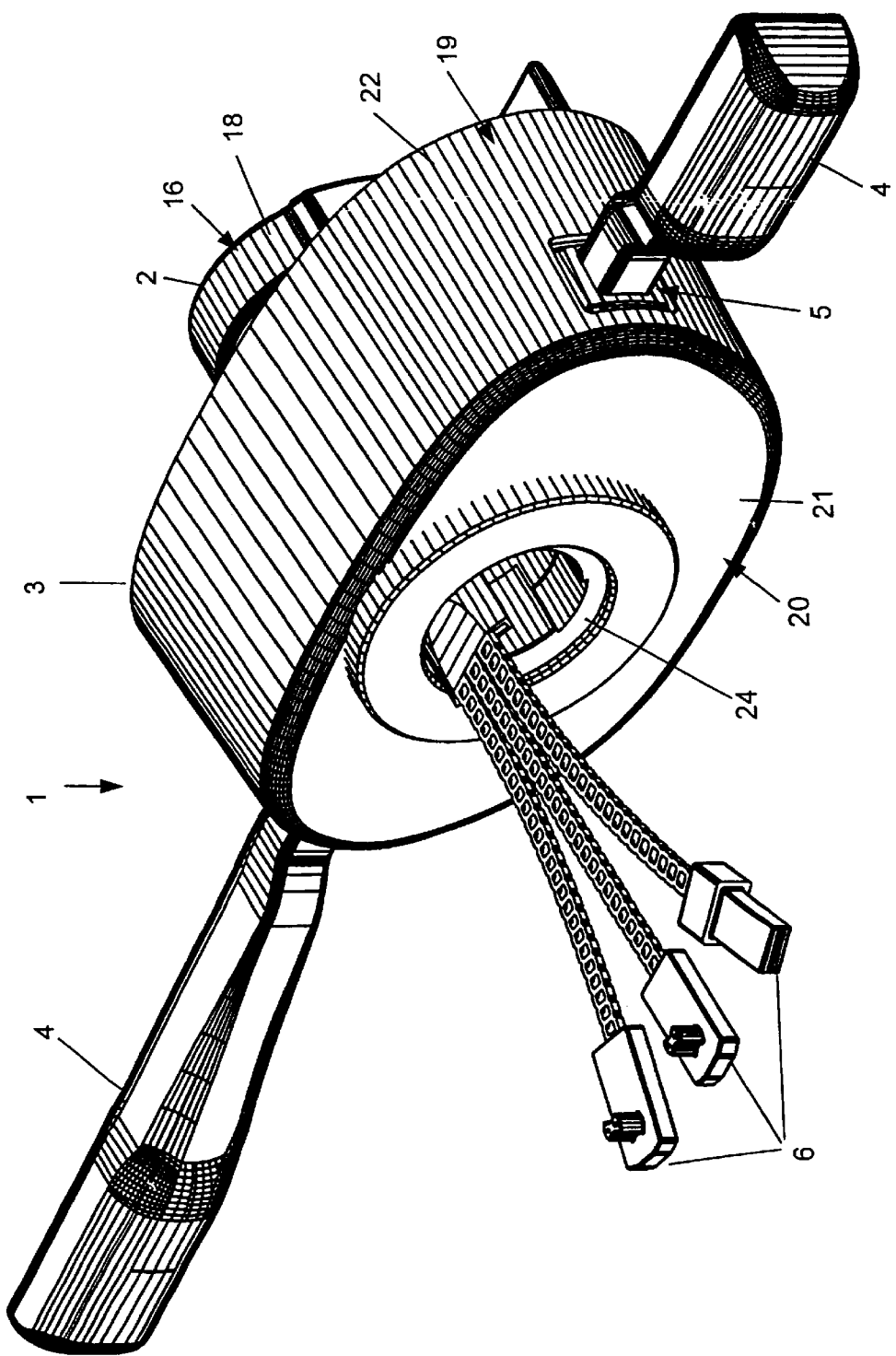
FIG. 1 a perspective view of the steering column switch of the invention herein, FIG. 2 a sectional view of a steering column switch in accordance with FIG. 1, FIG. 3 a sectional view of the illustration of FIG. 2 along line III—III.
Figure 2:
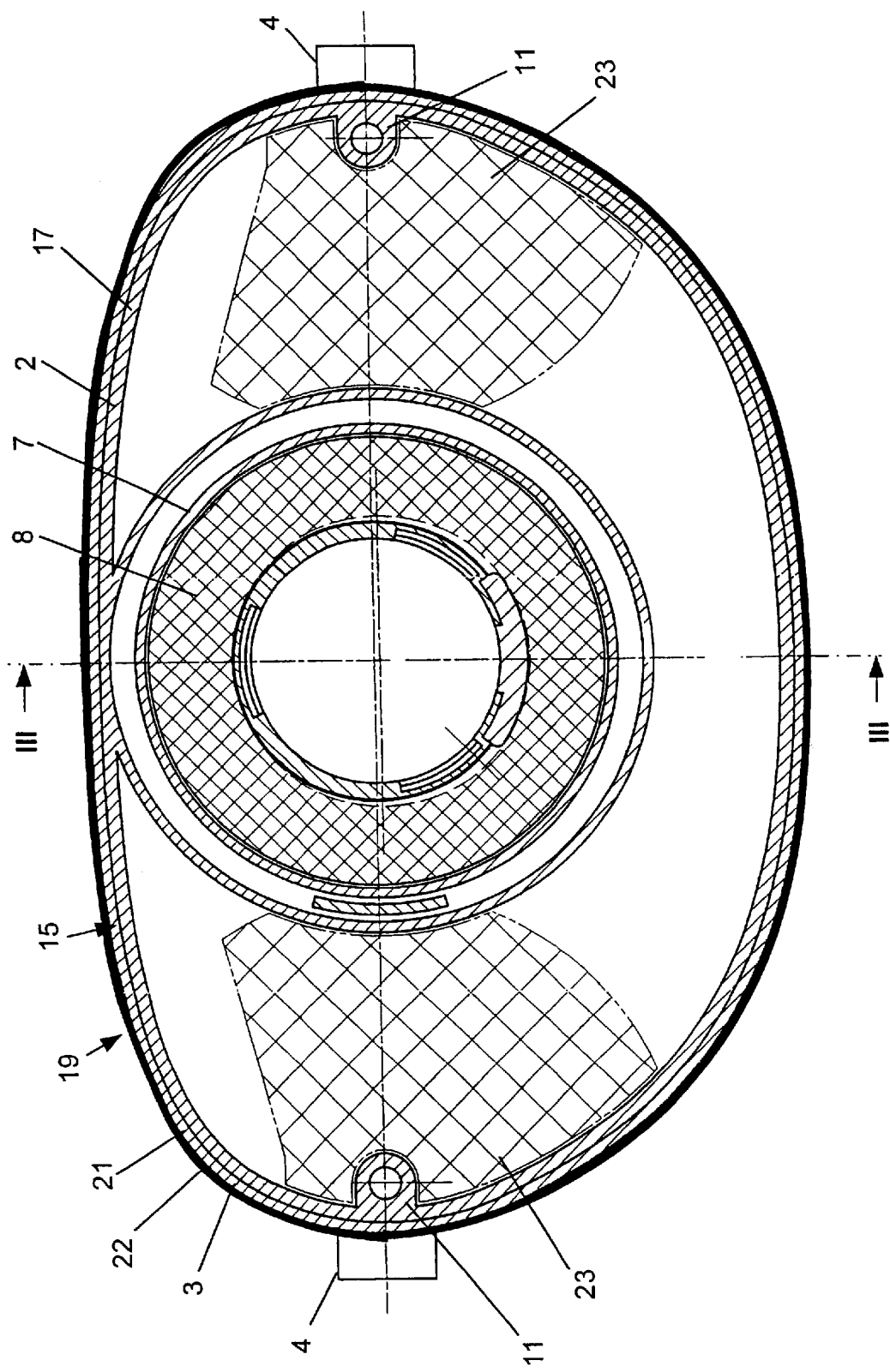
Figure 3:
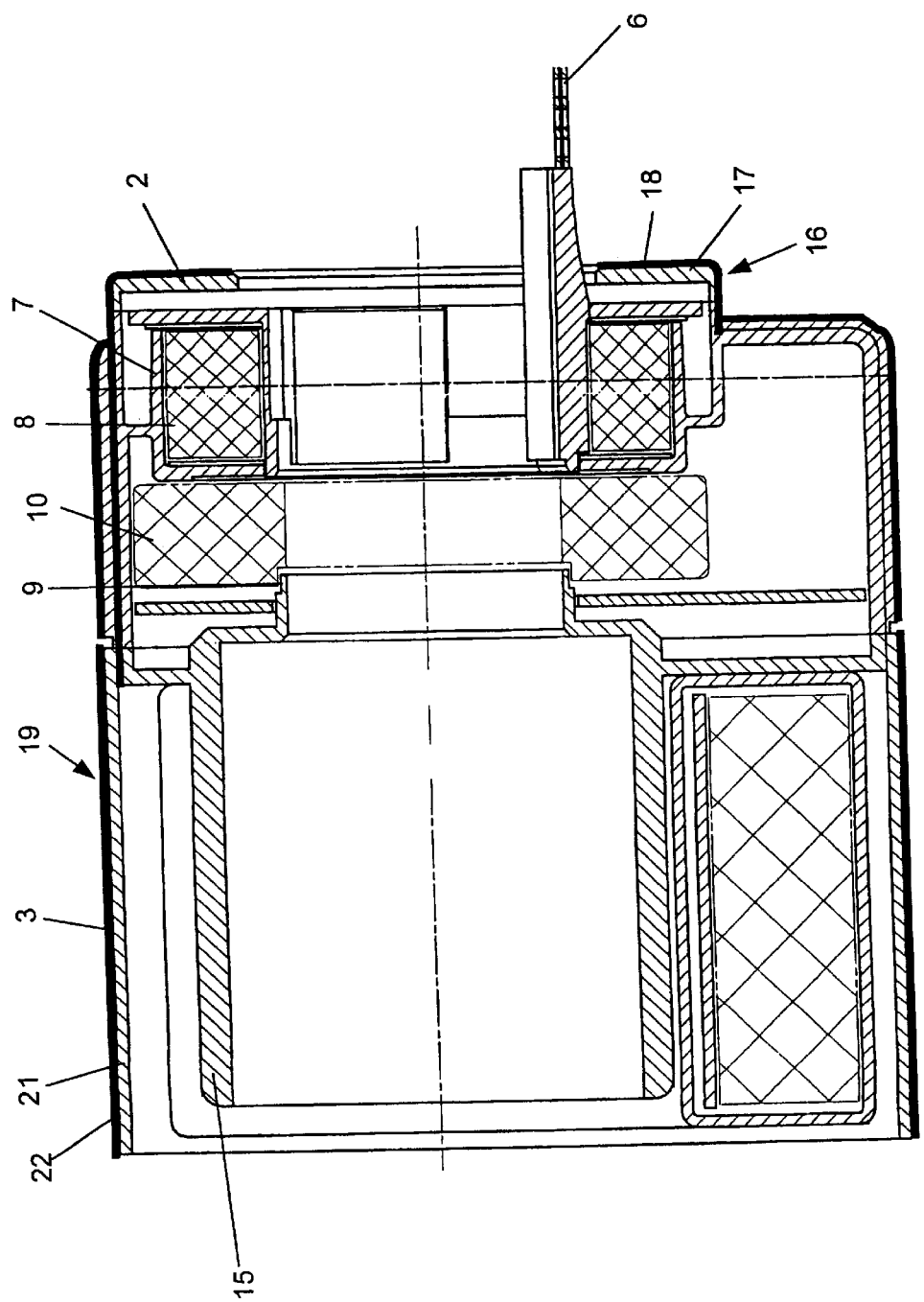

A steering column switch indicated generally at 1 comprises a support 2, as well as a housing 3 for the accommodation of individual switches 23 with actuation elements 4 extending through corresponding cutouts indicated generally at 5. On the side facing the steering wheel, housing 3 is provided with an opening 24 through which ribbon-type leads with associated connectors 6 are threaded for contact with an airbag module.

Support 2, which is at least partially set into housing 3, has a receptacle 7 for a spiral or "clock" type ribbon spring 8 for transmitting the electrical functions to the steering wheel, as well as a holder 9 for an angle sensor 10. Further provided are mounts 11 for switches 23 which may be configured as blinker, wiper/washer and light switches. Further provided is a section 11 for the accommodation of an electronic module 13 for the functions of an ignition starter switch. Furthermore, molded to support 2 is a mounting device 14 that secures steering column switch 1 in place on a motor vehicle jacket tube.

Inasmuch as support 2 is set at least partially in housing 3, a few of its wall sections indicated generally at 15 are not visible from the outside while other wall sections indicated generally at 16 extend beyond housing 3 and therefore are visible. The externally not visible wall sections 15, as well as the visible wall sections 16, consist of a common core 17 that is enclosed by a sleeve 18 in the area of the visible wall sections.

Likewise, housing 3 comprises wall sections indicated generally by reference numeral 19 that are visible from the outside and wall sections 20 that are not visible. These wall sections also have a common core 21 that is enclosed by a sleeve 22 in the area of visible wall sections 19.

Core 17, 21 is configured in such a manner and manufactured of such a material that it satisfies the technical requirements relating to strength and electrical properties. Sleeve 18, 22 primarily satisfies design requirements relating to the steering column switch 1. Accordingly, sleeve 18, 22 is designed in the appropriate color and with the desired surface structure in order to satisfy these requirements. Core 17, 21 and sleeve 18, 27 of support 2, as well as housing 3, are manufactured together in one injection molding process and therefore are connected with each other in one piece. In order to reduce the cycle time of the two-component injection molding process, sleeve 18, 22 has a smaller wall thickness than core 17, 21.

Although the invention has hereinabove been described with respect to the illustrated embodiments, it will be understood that the invention is capable of modification and variation and is limited only by the following claims.

What is claimed is:

1. A steering column switch, comprising:
   a support for supporting individual switches, said support being secured in place on a steering column of a motor vehicle,
   a housing coupled to said support, wherein the housing and the support include visible wall sections each consisting of a core and a sleeve, wherein said core and sleeve are formed with each other in one piece, wherein the core consists of a plastic material exhibiting relatively high rigidity and the sleeve consists of a plastic material exhibiting relatively low rigidity.

2. Steering column switch in accordance with claim 1, characterized in that the core and the sleeve are manufactured together by means of an injection molding process.

3. Steering column switch in accordance with claim 1, characterized in that the sleeve has a lesser wall thickness than the core.

4. Steering column switch in accordance with claim 1, wherein the sleeve and the core of the respective wall section of the housing have cutouts for the actuation elements of the individual switches.

5. Steering column switch in accordance with claim 4, wherein the sleeve extends at least partially around the respective cutout of the core.

6. Steering column switch in accordance with claim 4, wherein the sleeve projects slightly beyond the wall of the respective cutout of the core.

7. A steering column switch, comprising:
   a support for supporting individual switches, said support being secured in place on a steering column of a motor vehicle,
   a housing coupled to said support, wherein the housing and the support include visible wall sections each consisting of a core and a sleeve, wherein said core and sleeve are formed with each other in one piece, and wherein the sleeve has a lesser wall thickness than the core.

* * * * *